(12) United States Patent
Tamura et al.

(10) Patent No.: US 8,491,197 B2
(45) Date of Patent: Jul. 23, 2013

(54) OPTICAL CONNECTOR MODULE

(75) Inventors: Mitsuaki Tamura, Kanagawa (JP);
Osamu Shimakawa, Kanagawa (JP)

(73) Assignee: Sumitomo Electric Industries, Ltd.,
Osaka (JP)

( * ) Notice: Subject to any disclaimer, the term of this patent is extended or adjusted under 35 U.S.C. 154(b) by 228 days.

(21) Appl. No.: 13/087,837

(22) Filed: Apr. 15, 2011

(65) Prior Publication Data
US 2011/0262083 A1 Oct. 27, 2011

(30) Foreign Application Priority Data

Apr. 27, 2010 (JP) ................................. 2010-101922

(51) Int. Cl.
*G02B 6/38* (2006.01)
(52) U.S. Cl.
USPC ............................................. 385/61; 385/79
(58) Field of Classification Search
USPC ...................................................... 385/61, 79
See application file for complete search history.

(56) References Cited

U.S. PATENT DOCUMENTS

| 4,668,045 | A | * | 5/1987 | Melman et al. | 385/82 |
|---|---|---|---|---|---|
| 4,770,488 | A | * | 9/1988 | Shank et al. | 385/79 |
| 5,440,658 | A | * | 8/1995 | Savage, Jr. | 385/79 |
| 5,495,545 | A | * | 2/1996 | Cina et al. | 385/92 |
| 5,692,083 | A | * | 11/1997 | Bennett | 385/88 |
| 6,201,908 | B1 | * | 3/2001 | Grann | 385/24 |
| 6,536,959 | B2 | * | 3/2003 | Kuhn et al. | 385/93 |
| 7,510,337 | B2 | * | 3/2009 | Takeda et al. | 385/88 |
| 7,891,884 | B2 | | 2/2011 | Sumi et al. | |
| 8,272,791 | B2 | * | 9/2012 | Chen | 385/79 |
| 2003/0095760 | A1 | * | 5/2003 | Lee et al. | 385/93 |
| 2008/0069500 | A1 | * | 3/2008 | Harness et al. | 385/59 |
| 2008/0267563 | A1 | * | 10/2008 | Miyanari et al. | 385/33 |
| 2012/0020626 | A1 | * | 1/2012 | Tanazawa | 385/79 |

FOREIGN PATENT DOCUMENTS

JP 63056617 A * 3/1988
JP 2007-171556 A 7/2007

* cited by examiner

*Primary Examiner* — Charlie Peng
(74) *Attorney, Agent, or Firm* — Global IP Counselors, LLP

(57) ABSTRACT

There is provided an optical connector module in which an adhesive is interposed between a lens and a distal surface of an optical fiber, wherein the module includes a transparent positioning device and an optical fiber fixed in the positioning device. The positioning device has a lens provided to an end surface, a concave insertion portion into which the optical fiber is inserted and which is disposed so that the bottom surface in contact with the distal surface of the optical fiber is positioned opposite the lens, and a debris receiving portion that extends from the bottom surface in a radial direction of the optical fiber and has a surface continuous with the bottom surface.

9 Claims, 2 Drawing Sheets

OPTICAL CONNECTOR MODULE

BACKGROUND OF THE INVENTION

1. Technical Field

The present invention relates to an optical connector module for coupling an optical signal to a photoelectric conversion element, a lens, and/or other target members.

2. Description of the Background Art

Disclosed in Japanese Laid-open Patent Publication No. 2007-171556 is a photoelectric conversion module for optically coupling an optical transmission channel and a light-emitting element and/or a light-receiving element. This photoelectric conversion module has a photoelectric conversion element package and a holder composed of an optically transparent resin material and used to accommodate the photoelectric conversion element package, wherein the holder is provided with a lens and an attachment hole for fitting a ferrule. The ferrule, in which an optical fiber is inserted and fixed, is inserted into the attachment hole.

DISCLOSURE OF THE INVENTION

An object of the present invention is to provide an optical connector module which has a minimal loss of light and to which an optical fiber is attached directly without the use of a ferrule.

In order to accomplish the stated object, an optical connector module includes a transparent positioning device and an optical fiber. The transparent positioning device includes a lens, a concave insertion portion, and a debris receiving portion. The lens is provided at a first exterior surface of the transparent positioning device. The concave insertion portion extending from a second exterior surface, which is located at an opposite side of the transparent positioning device relative to the first exterior surface, to an interior surface that is located within the transparent positioning device proximate of the lens. The debris receiving portion extends from the interior surface in a radial direction of the optical fiber and has a surface continuous with the interior surface such that the debris receiving portion provides debris receiving space in the area surrounding the interior surface of the concave insertion portion. The optical fiber is inserted into the concave insertion portion and it contacts the interior surface of the concave insertion portion. As used herein, the term "debris receiving portion having a surface continuous with the interior surface" refers to the fact that the interior surface at least partially defines the debris receiving portion without an interposed sidewall of the insertion hole.

Because the positioning device is provided with a debris receiving portion that is formed continuously with the interior surface of the concave insertion portion, scraping debris can escape into the debris receiving portion if the optical fiber scrapes the positioning device during insertion. Furthermore, air bubbles can escape into the debris receiving portion even if they are present in an adhesive when the adhesive is applied to the distal surface of the optical fiber and the optical fiber is inserted into the concave insertion portion. For this reason, scraping debris and/or air bubbles in the adhesive will not be interposed between the distal surface of the optical fiber and the lens, and an optical connector module in which the loss of light is minimal can therefore be provided.

DESCRIPTION OF THE INVENTION

Figure 1:
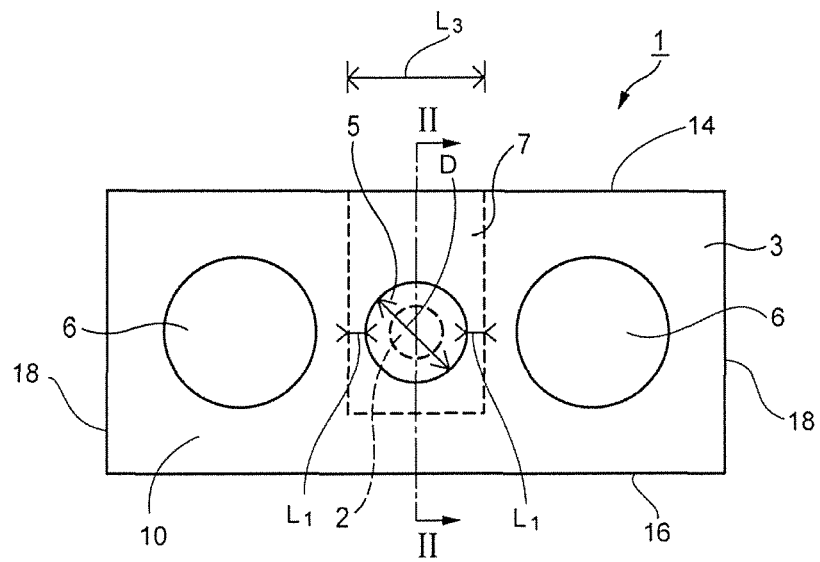
FIG. 1 is a front view of the optical connector module according to an embodiment of the present invention.

An embodiment of the present invention is described below with reference to the drawings. The drawings are meant to be descriptive and are not meant to limit the scope of the invention. In the drawings, identical reference symbols show identical parts in order to avoid repeating the description. The dimensions in the drawings are not necessarily to scale.

The inventors considered directly attaching the optical fiber to the holder (positioning device) and dispensing with the ferrule in the optical module disclosed in Japanese Laid-open Patent Publication No. 2007-171556. However, it has become apparent that the problems described below occur when an optical fiber is merely inserted and fixed into an attaching hole (insertion hole) provided to the positioning device.

Figure 3:
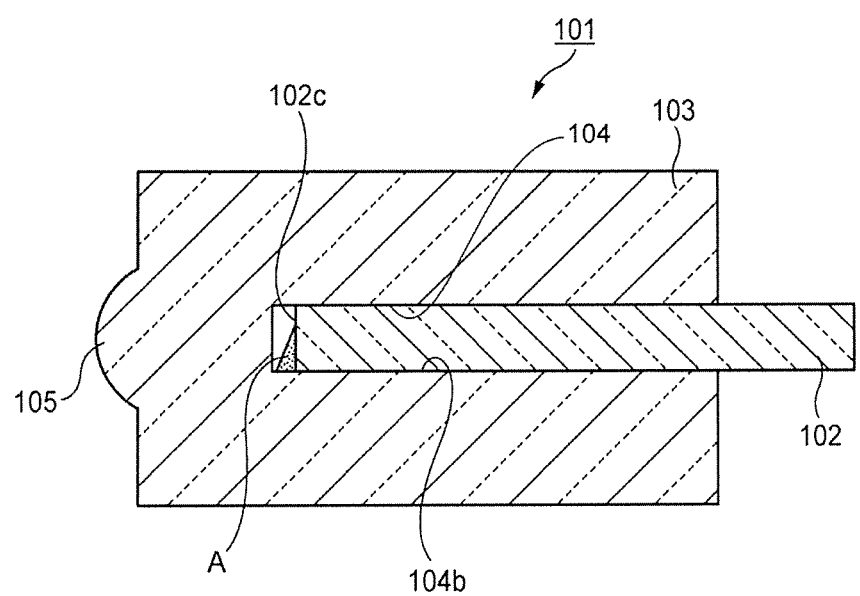
FIG. 3 is a longitudinal sectional view of the optical connector module according to a reference example.

FIG. 3 is a longitudinal sectional view of an optical connector module 101 according to a reference example. The reference example includes a glass optical fiber 102 and a positioning device 103. The positioning device 103 includes an insertion hole 104. Typically, the glass optical fiber 102 is made of a first material and the positioning device 103 is made of a second material (a transparent resin) where the first material is harder than the second material. Because the glass optical fiber 102 is harder than the positioning device 103 formed from a transparent resin, the distal surface 102c of the optical fiber 102 can scrape an inner wall 104b of the insertion hole 104 of the positioning device 103 and can generate scraping debris A when the optical fiber 102 is inserted into the insertion hole 104 provided to the positioning device 103. It is likely that light will be lost if the optical fiber 102 is fixed within the insertion hole 104 while the scraping debris A is interposed between the distal surface 102c of the optical fiber 102 and the lens 105, as indicated in FIG. 3.

Furthermore, the optical fiber 102 is inserted into the insertion hole 104 with adhesive applied to the distal surface 102c of the optical fiber 102 in order to fix the optical fiber 102 into the positioning device 103. However, air bubbles may be present in the adhesive, or air bubbles may form in the adhesive during the insertion of the optical fiber 102 into the insertion hole 104. More light is lost during light transmission between the optical fiber 102 and the positioning device 103 if the optical fiber 102 is fixed into the positioning device 103 while air bubbles remain interposed between the distal surface 102c of the optical fiber 102 and the lens 105.

Figure 2:
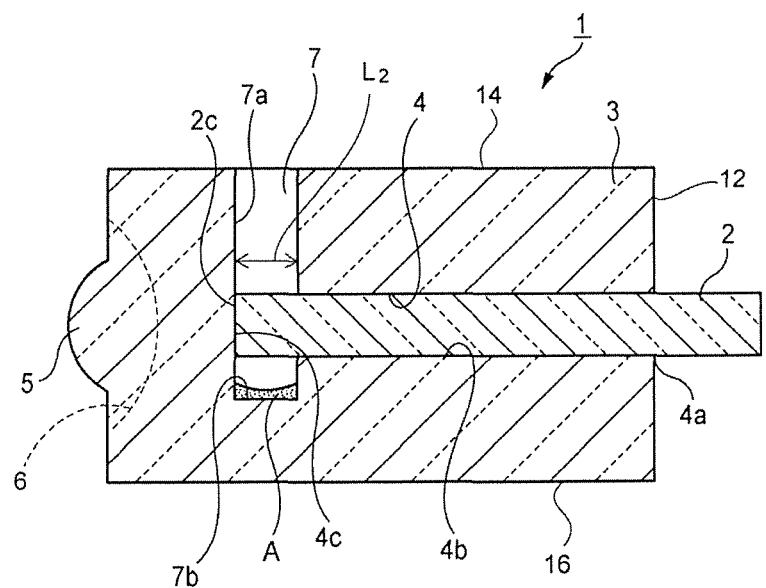
FIG. 2 is a cross-sectional view of the optical connector module along line II-II in FIG. 1.

FIG. 1 is a front view of an optical connector module 1 according to an embodiment of the present invention, and FIG. 2 is a cross-sectional view of the optical connector module 1 taken along line II-II in FIG. 1. The optical connector module 1 includes an optical fiber 2 and a positioning device 3 into which the optical fiber 2 is directly inserted and fixed, as explained below.

The optical fiber 2 has a core and an outer cladding that has a refraction index lower than that of the core. The optical fiber 2 can be any one of an AGF (All Glass Fiber) where both the core and the cladding are formed from glass, a HPCF (Hard Plastic Clad Fiber) where the core is formed from glass and the cladding is formed from hard plastic, or a POF (Plastic Optical Fiber) where both the core and the cladding are formed from plastic.

The positioning device 3 is a substantially rectangular parallelepipedal member formed from polyetherimide or another transparent resin, and has an insertion hole (concave insertion portion) 4 into which the optical fiber 2 is inserted, a lens 5, a concave fitting portion 6 and a debris receiving portion 7. The positioning device 3 has a front surface 10, a rear surface 12, a top surface 14, a bottom surface 16, and side surfaces 18. The surfaces 10, 12, 14 and 16 are indicated in FIG. 2, while the side surfaces 18 are only indicated in FIG. 1. The positioning device 3 is provided with two concave fitting portions 6 on the front surface 10. The concave fitting portions 6 are dimensioned to mate with convex fitting portions (not shown) on a corresponding mating device (not shown). By fitting the concave fitting portions 6 onto convex fitting portions provided on the mating device (not shown), the optical connector module 1 easily connects to other devices in a state in which the lens 5 faces a photoelectric conversion element or a lens or other optical part mounted on the mating device.

The insertion hole 4 is a cylindrical space that extends in a longitudinal direction (the left-to-right direction in FIG. 2) of the positioning device 3 from the opening 4a formed in the rear surface 12 of the positioning device 3 to an interior surface 4c provided proximate the lens 5. The insertion hole 4 extends in a direction parallel to the top surface 14 of the transparent positioning device 3. The diameter D of the insertion hole 4 is set so as to be the same or slightly greater than the diameter of the optical fiber 2. The optical fiber 2 is inserted into the insertion hole 4 until the distal surface 2c comes into contact with the interior surface 4c with a light-permeable adhesive is applied to the distal surface 2c. Consequently, the optical fiber 2 is fixed in position within the positioning device 3.

The lens 5 is a convex lens molded integrally with the positioning device 3 such that the lens 5 projects outward slightly from the front surface 10 of the positioning device 3. In other words, the lens 5 is unitarily formed with the positioning device 3 such that the lens 5 and the positioning device 3 together define a single monolithic element. The lens 5 is provided to the front surface 10 of the positioning device 3 opposite the rear surface 12 where the opening 4a is formed. Further, since the positioning device 3 is made of a transparent material, the lens 5 is positioned facing the distal surface 2c of the optical fiber 2 and in alignment with the insertion hole 4. The lens 5 causes the light transmitted by the optical fiber 2 to converge and to be efficiently transmitted to a corresponding lens or other optical element, or to a light-receiving element or other photoelectric conversion element in the above mentioned mating device (not shown) connected so as to face the lens 5.

The positioning device 3 further includes the debris receiving portion 7 that extends from the top surface 14 to a point below the end of the insertion hole 4 and a side of the lens 5 adjacent to the optical fiber 2. The debris receiving portion 7 extends in a direction perpendicular to the top surface 14. The debris receiving portion 7 is a space capable of accommodating any scraping debris A generated by moving or scraping contact between the distal surface 2c of the optical fiber 2 and the sidewall 4b of the insertion hole 4 at the time the optical fiber 2 is inserted into the insertion hole 4. Hence, the debris receiving portion 7 is a debris receiving portion. In order to ensure that the scraping debris A that is generated from the sidewall 4b near the interior surface 4c is accommodated in the debris receiving portion 7, the side surface 7a of the debris receiving portion 7 on the side of the lens is formed so as to be continuous with the interior surface 4c of the insertion hole 4. In other words, the interior surface 4c of the insertion hole 4 and a portion of the side surface 7a of the debris receiving portion 7 coincide with one another.

As indicated in FIG. 2, in order to secure space for storing the scraping debris A, the debris receiving portion 7 provides a space that surrounds the bottom surface 4c. Further, the length $L_1$ over which the debris receiving portion 7 extends in the radial direction around the optical fiber 2 is preferably at least 1 mm at the shortest location, and the thickness $L_2$ (in the left-to-right direction in FIG. 2) of the debris receiving portion 7 is preferably about 1 mm. Further, an overall width L3 (FIG. 1) of the debris receiving portion 7 is greater than the diameter D of the insertion hole 4 and the optical fiber 2. The shape of the debris receiving portion 7 is not particularly limited so long as the side surface 7a on the side of the lens is continuous with the bottom surface 4c of the insertion hole 4. When the debris receiving portion 7 is formed as a hole with a bottom, the bottom surface 7b may be a flat surface or a curved surface. The debris receiving portion 7 may also be a through-hole that is open from either one of the side surfaces 18 or the bottom surface 16 (any surface on which no lens 5 or opening 4a is formed) of the positioning device 3 through to another side surface, rather than a hole with a closed bottom.

When the debris receiving portion 7 is formed as a hole with a bottom that is open on the top surface 14 of the positioning device 3, as with the optical connector module 1, the debris receiving portion 7 can be formed integrally during the ejection molding of the positioning device 3. The debris receiving portion 7 can also be formed by cutting with a drill or other tool.

When the optical connector module 1 is produced, the optical fiber 2 is inserted into the insertion hole 4 through the opening 4a until the distal surface 2c of the optical fiber 2 comes into contact with the interior surface 4c of the insertion hole 4. When the optical fiber is AGF, the hardness of the optical fiber 2 is greater than the hardness of the positioning device 3 made of resin. Therefore, the distal surface 2c of the optical fiber 2 scrapes the sidewall 4b of the insertion hole 4 provided to the positioning device 3, and generates scraping debris A. However, the scraping debris A moves towards the interior surface 4c while pushed by the distal surface 2c of the optical fiber 2, and is accommodated in the debris receiving portion 7 provided on the side of the insertion hole 4 facing the lens 5. Therefore, because the scraping debris A does not remain between the distal surface 2c of the optical fiber 2 and the lens 5, an optical connector device with a minimal loss of light can be provided.

The scraping debris A is interposed between the distal surface 2c of the optical fiber 2 and the lens 5 in a structure in which the debris receiving portion 7 and the interior surface 4c are at a distance from each other and the resulting space is connected by the sidewall 4b of the insertion hole 4. With the optical connector module 1, however, the side surface 7a of the debris receiving portion 7 on the side of the lens and the interior surface 4c of the insertion hole 4 are aligned with each other, allowing the scraping debris A generated from the sidewall 4b near the interior surface 4c to be accommodated in the debris receiving portion 7, and preventing the scraping debris A from being interposed between the distal surface 2c of the optical fiber 2 and the lens 5.

As described below, a problem arises regardless of the relation between the hardness of the optical fiber 2 and the hardness of the positioning device 3. For example, there are risks of the machining debris A remaining on the sidewall 4b if the insertion hole 4 was formed by cutting. Even in this case, however, the machining debris A can be accommodated in the debris receiving portion 7 when the machining debris A is pushed and caused to move along the insertion hole 4 all the way to the debris receiving portion 7 by the distal surface 2c of the optical fiber 2 at the time the optical fiber 2 is inserted.

For this reason, the machining debris A does not remain between the distal surface 2c of the optical fiber 2 and the lens 5, and an optical connector module 1 in which the loss of light is minimal can therefore be provided.

Similarly, when adhesive is applied on the distal surface 2c of the optical fiber 2, and the optical fiber 2 is inserted into the insertion hole 4 and fixed in the positioning device 3, there are risks that air bubbles will be present in the adhesive or enter the adhesive during the insertion of the optical fiber 2. However, according to the optical connector module 1, the adhesive that contains air bubbles can be allowed to escape into the debris receiving portion 7 by pressing the optical fiber 2 against the interior surface 4c. For this reason, a situation can be created in which no air bubbles remain between the distal surface of the optical fiber 2 and the lens 5, and an optical connector module 1 in which the loss of light is minimal can therefore be provided.

Loss of light can therefore be made minimal in the optical connector module 1 of the present embodiment, regardless of whether the optical fiber 2 is AGF, HPCF, or POF.

The insertion hole 4 has been described as a cylindrical hole in the above embodiment, but the hole may be shaped differently. For example, the positioning device 3 may be formed from a base member having a mating surface and a cover member for covering the mating surface of the base member, and the insertion hole 4 may be formed as a cross-sectionally V-shaped gap formed at the mating surface.

What is claimed is:

1. An optical connector module comprising a transparent positioning device and an optical fiber,
    the transparent positioning device including a lens, a concave insertion portion, and a debris receiving portion,
    the lens being provided at a first exterior surface of the transparent positioning device,
    the concave insertion portion extending from a second exterior surface of the transparent positioning device to an interior surface of the transparent positioning device located within the transparent positioning device proximate the lens, the second exterior surface being located at an opposite side of the transparent positioning device relative to the first exterior surface,
    the debris receiving portion extending from a third exterior surface of the transparent positioning device such that the interior surface at least partially defines the debris receiving portion, the debris receiving portion providing a debris receiving space in the area surrounding the interior surface, the debris receiving portion extending lengthwise in a first direction and the concave insertion portion extends lengthwise in a second direction that is perpendicular to the first direction; and
    the optical fiber being inserted into the concave insertion portion from the second exterior surface and contacting the interior surface.

2. The optical connector module according to claim 1, wherein
    the transparent positioning device includes at least one fitting portion.

3. The optical connector module according to claim 2, wherein
    the fitting portion includes a pair of concave fitting portions disposed on opposite sides of the lens on the first exterior surface of the transparent positioning device.

4. The optical connector module according to claim 1, wherein
    the concave insertion portion is aligned with the lens such that the interior surface coincides with one surface of the lens.

5. The optical connector module according to claim 1, wherein
    the lens and the transparent positioning device are unitarily formed as a single monolithic element.

6. The optical connector module according to claim 1, wherein
    the lens protrudes outward from the first exterior surface of the transparent positioning device.

7. The optical connector module according to claim 1, wherein
    the debris receiving portion has a width measured perpendicular to the first direction and the second direction, and
    the concave insertion portion has a diameter that is smaller than the width of the debris receiving portion.

8. The optical connector module according to claim 1, wherein
    the concave insertion portion extends in a direction that is parallel to the third surface of the transparent positioning device and the debris receiving portion extends in a direction perpendicular to the third surface.

9. The optical connector module according to claim 1, wherein
    with the optical fiber inserted into the concave insertion portion and contacting the interior surface, a circumferential end section of the optical fiber is exposed within the debris receiving portion.

* * * * *